United States Patent [19]
Chen

[11] Patent Number: 5,481,967
[45] Date of Patent: Jan. 9, 1996

[54] VENTED LID FOR BAKING AND FRYING ON FLAT SURFACES

[76] Inventor: Ming-Jing Chen, No. 29, Alley 39, Lane 206, Sec. 2, Tai-Ho Rd., Ah-Yi Li, Changhua City, Taiwan

[21] Appl. No.: 364,941

[22] Filed: Dec. 28, 1994

[51] Int. Cl.⁶ ............................. A23N 15/00; A47J 43/00
[52] U.S. Cl. .............................. 99/446; 99/645; 126/381; 126/299 C
[58] Field of Search ............................. 99/645, 422, 423, 99/446; 220/369; 126/390, 381, 299 C

[56] References Cited

U.S. PATENT DOCUMENTS

| | | | |
|---|---|---|---|
| 539,861 | 5/1895 | Epp | 126/381 |
| 1,807,271 | 5/1931 | Asadoorian | 126/299 C |
| 2,568,637 | 9/1951 | Jardim | 126/299 C |
| 2,867,352 | 1/1959 | Kawano | 126/299 C |
| 3,890,450 | 6/1975 | Orenstein | 99/645 |

Primary Examiner—David Scherbel
Assistant Examiner—Reginald L. Alexander
Attorney, Agent, or Firm—David I. Klein; Morton J. Rosenberg

[57] ABSTRACT

A vented lid for baking and frying on a flat pan is provided. The vented lid includes a glass frustro-conically shaped lid having a centrally located ventilating hole at the top. The frustro-conical wall inclines at a 47 degree angle and includes a handle secured to an outer surface of the lid. An oil gathering plate having a large through hole formed in the center and having a recess formed around the through hole. Several reverse S-shaped hooks are formed on the perimeter of the flange of the plate to secure a flange of the glass lid thereto. A slit is formed between the flange of the glass lid and the plate when they are coupled together. During cooking, cool air enters through the slit and hot air rises out through the central ventilating hole.

2 Claims, 4 Drawing Sheets

VENTED LID FOR BAKING AND FRYING ON FLAT SURFACES

BACKGROUND OF THE INVENTION

1. Field of the Invention

The present invention relates to cooking utensils. More particularly, this invention relates to a vented lid for baking and frying on a flat pan, consistent with current environmental requirements.

2. Prior Art

Conventionally, iron plates are commonly used for baking or frying beefsteak and porksteak at restaurants or at home. In order to be able to view the baking or frying operation, there is usually no lid used to cover the foodstuff. Thus, not only is the foodstuff not done evenly, but also pollutants are produced which pollute the environment and are harmful to our health.

SUMMARY OF THE INVENTION

The present invention not only provides a lid which was made of transparent glass and an iron plate for baking and frying without difficult, on a flat pan, but also eliminating all of the aforesaid problems.

According to the preferred embodiment of the present invention, the transparent glass, vented lid is designed with a frustro-conical shape having a wall inclined at a 47 degree angle, and a ventilating hole centrally located at the top. An iron plate is provided with a big center through hole and an undulating rim or flange around the center through hole forming a recess for gathering the oil condensate which drips down from the inner wall of glass lid. On the flange of the iron plate there are three elastic hooks which are used to couple together the glass lid and iron plate, but with small slits being left between the flanges of the glass lid and that of the iron plate. When baking or frying, cold air enters through the slits and the hot air rises out through the top center ventilating hole of the glass lid, while most of the air which is mixed with cooking oil strikes the inclined inner wall of the glass lid. The oil which splatters on the lid as well as that which condenses drips down into a recess formed in the iron plate, so that the air that rises through the ventilating hole is clean, without oil. Additionally, the baking or frying process can be controlled through the transparent glass lid. The present invention not only has the aforesaid features, but also is very easy to assemble, disassemble and clean.

DETAILED DESCRIPTION OF THE PREFERRED EMBODIMENT

Figure 1:
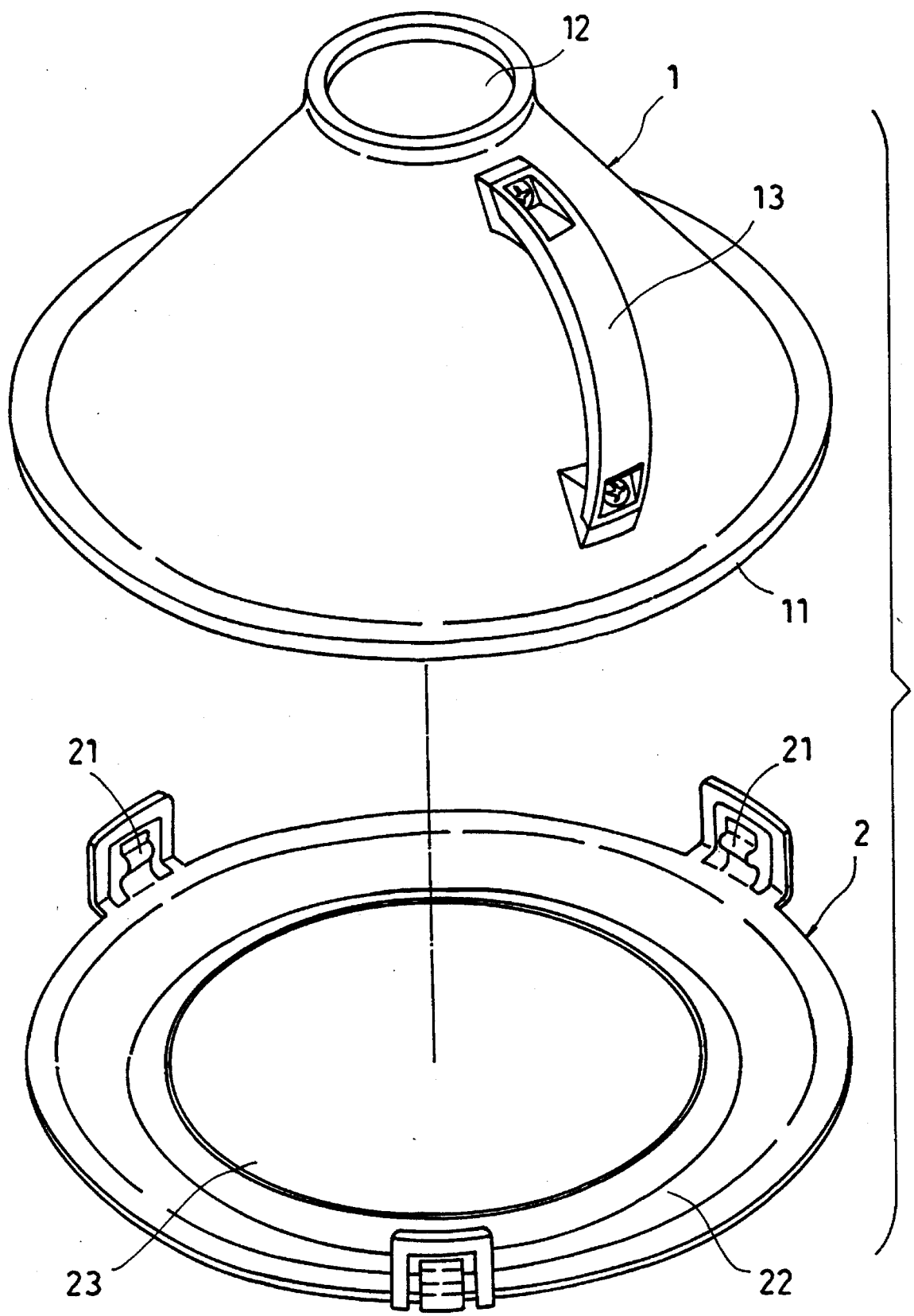
FIG. 1 is an exploded perspective view of the vented lid of the present invention.
Figure 2:
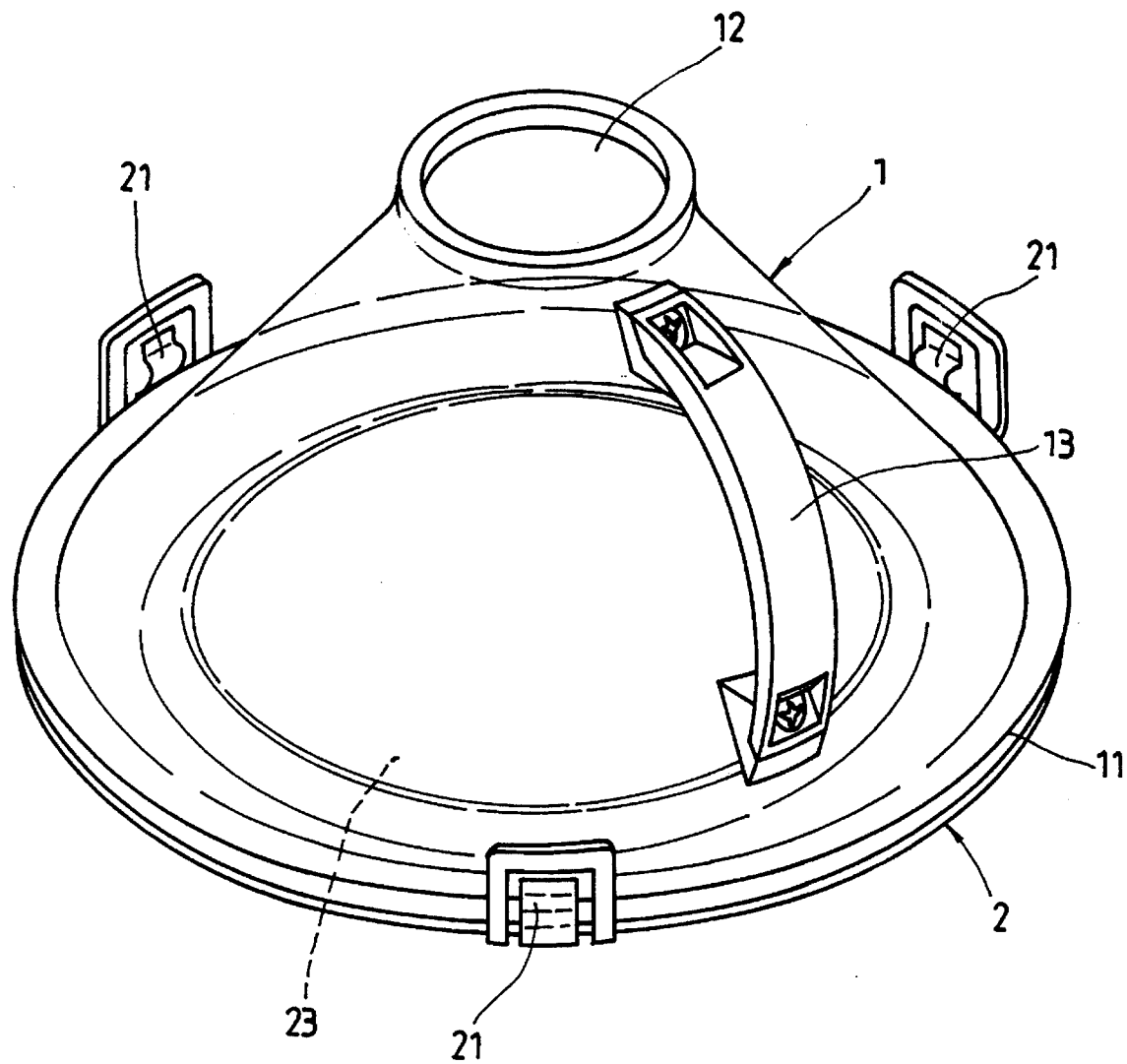
FIG. 2 is an elevational view showing an assembled vented lid of the present invention.
Figure 3:
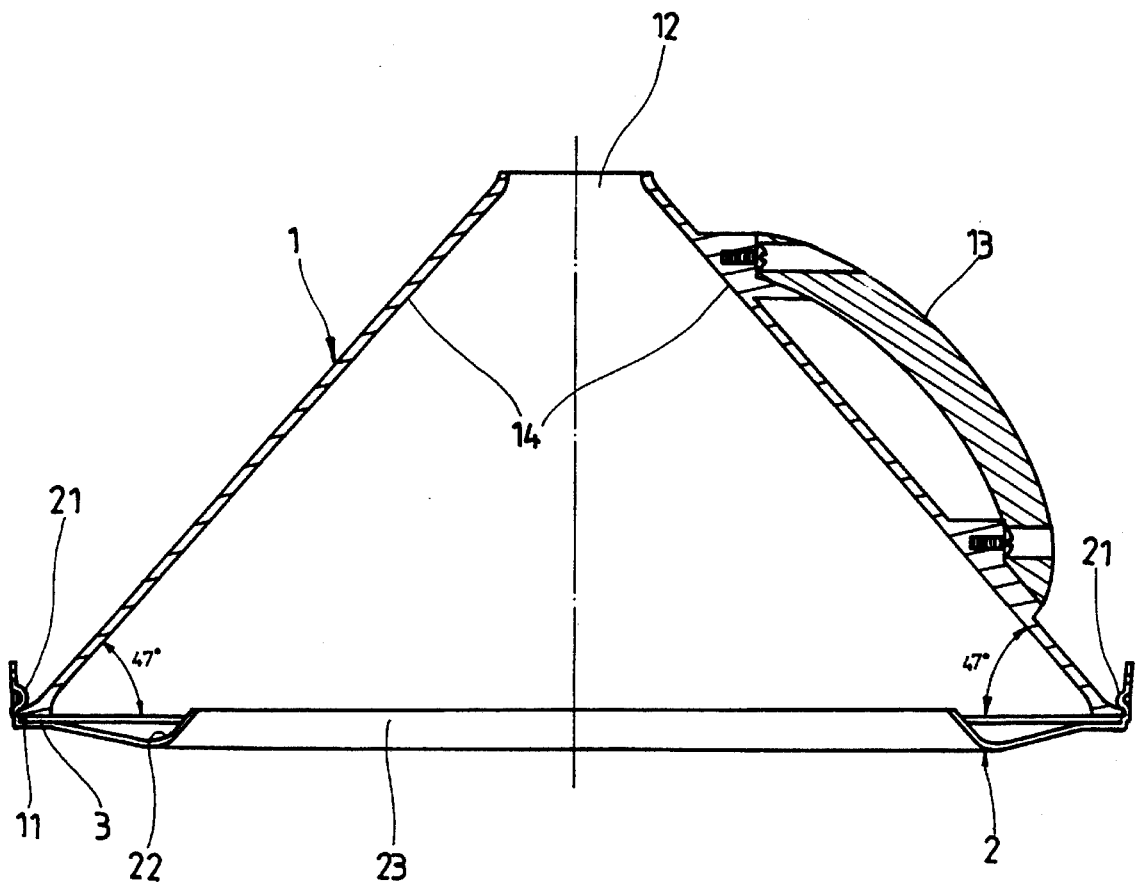
FIG. 3 is a cross-sectional view of the assembled vented lid of the present invention.
Figure 4:
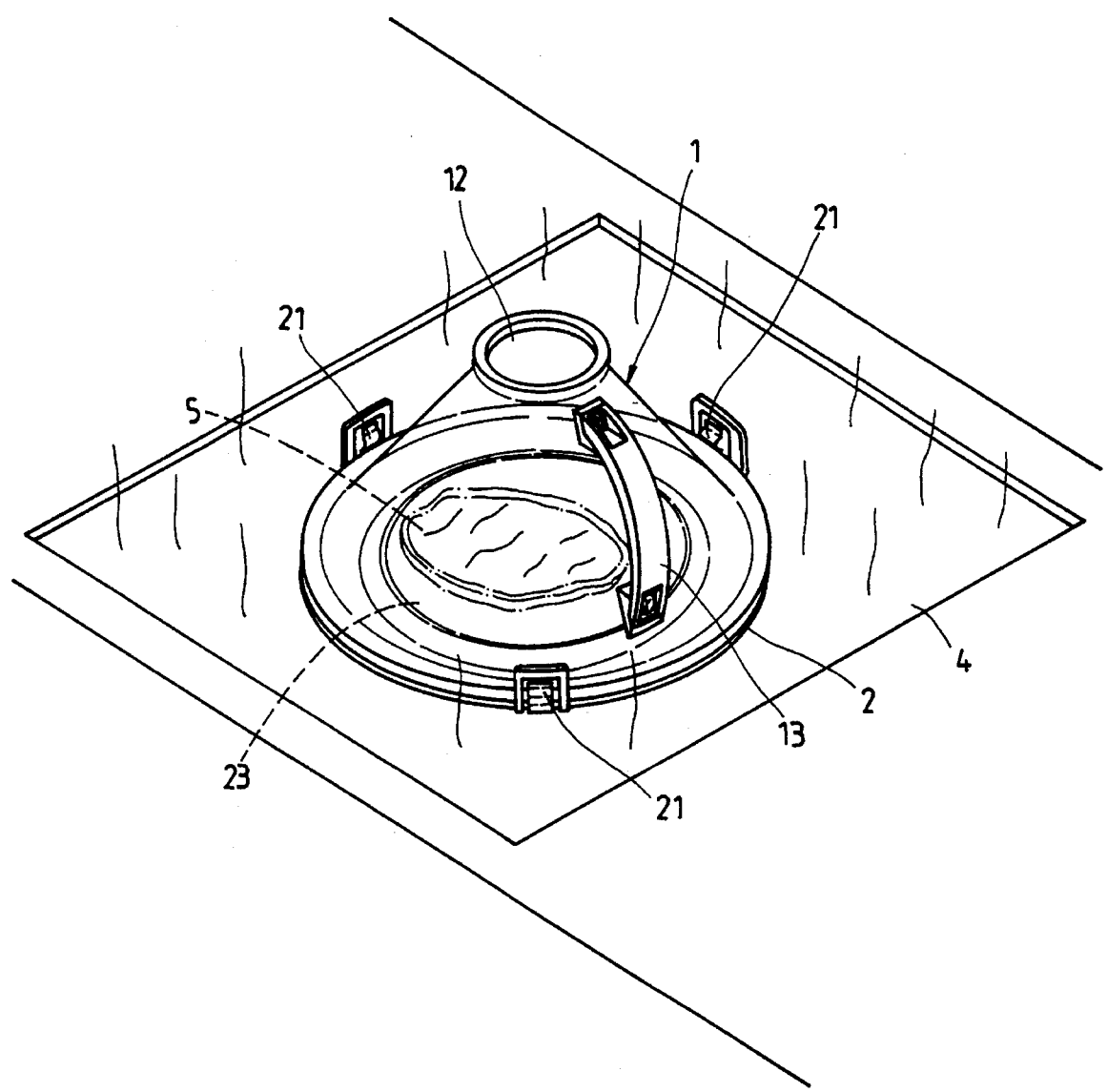
FIG. 4 is a perspective view of the present invention in use.

Referring to FIGS. 1 to 4, a vented lid for baking and frying on a flat plate is shown. The vented lid is generally comprised of an oil gathering iron plate 2 with a large centrally located through hole 23, an undulating rim 22 forming a recess around the center through hole 23, and three reverse S-shaped hooks 21 formed on the outer perimeter of the rim 22 for coupling the flange 11 of glass lid 1. A frustro-conically shaped glass lid 1 having a wall inclined at an angle of 47 degrees with respect to a horizontal plane defined by the flange 11. The frustro-conical wall extends up to a centrally located ventilating hole 12 at the top, for ventilating heated air therefrom. A small slit 3 is defined between the flanges 11 of the lid i and the rim 22 of the plate 2. A handle 13 is secured to the glass lid i for convenience.

During baking and frying, the glass lid 1 is assembled and put over a beef steak 5 on the flat pan 4. A portion of the air and oil vapor produced by cooking rises out through the ventilating hole 12 of glass lid 1, but most of the air and oil vapor is blocked by he inclined inner wall 14 of glass lid 1, so that oil drips down into the recess of the undulating flange 22 of the plate 2. When the hot air rises out through the top center ventilating hole 12, cool air enters through the slit 3 between the flange 11 of glass lid 1 and the rim 22 of plate 2, so as to provide ventilation within the glass lid 1, to shorten cooking time and improve the taste of the foodstuff being cooked.

What is claimed is:

1. A vented lid for baking and frying on a flat pan, comprising:

a glass lid having a frustro-conically shaped wall defining an interior volume and a circularly shaped flange on a bottom end of said wall, said wall extending from said circularly shaped flange at a predetermined angle to a centrally located ventilation opening formed at a top end of said wall for passage therethrough of heated air from said interior volume; and an oil gathering plate positioned on a flat cooking surface and releasably coupled to said glass lid, said oil gathering plate having an annular rim defining a large centrally located through opening to position food being cooked in open communication with said interior volume, said annular rim having an undulating cross-sectional contour forming (1) an annular recess in said rim for receiving cooking oil which drips from said glass lid and (2) a slit between said coupled glass lid and said rim for passage of air into said interior volume, said oil gathering plate having three elastic hooks formed in radially spaced relation on a perimeter edge of said rim for releasably engaging said flange of said glass lid to said annular rim.

2. The vented lid as recited in claim 1 where said predetermined angle of said frustro-conically shaped wall is 47 degrees with respect to a plane defined by said flange of said glass lid.

* * * * *